June 3, 1969
R. B. McCUNE
3,448,433
OVERSPEED AND UNDERSPEED ALARM SYSTEM
Filed Jan. 18, 1966
Sheet 1 of 2
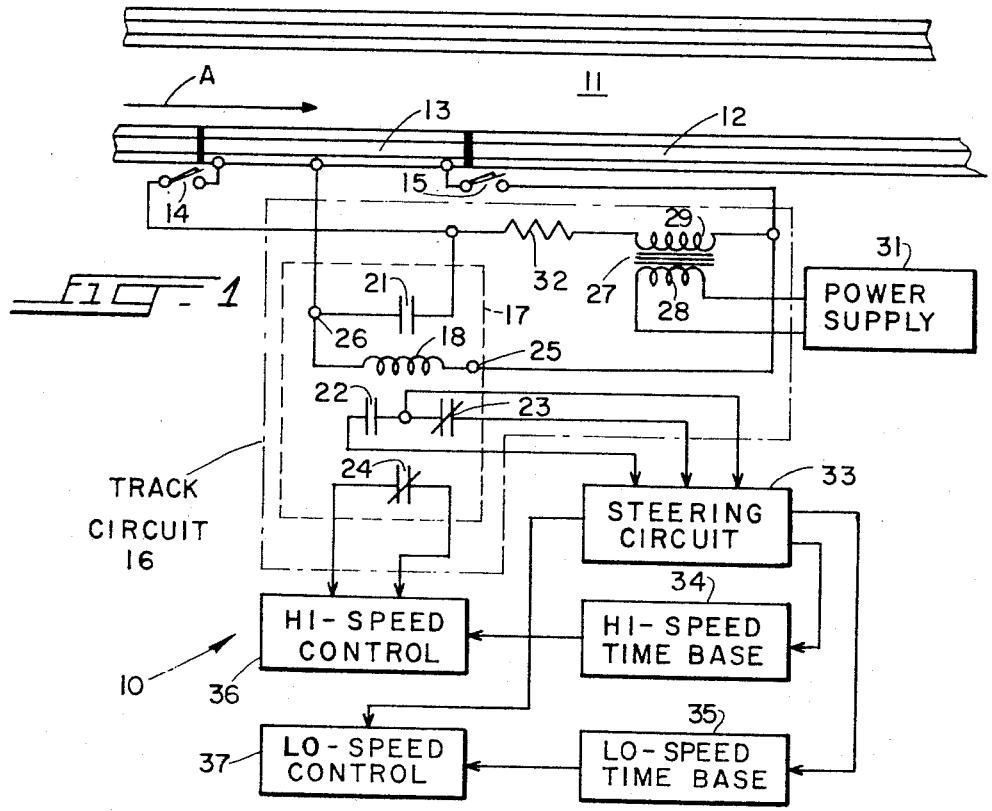
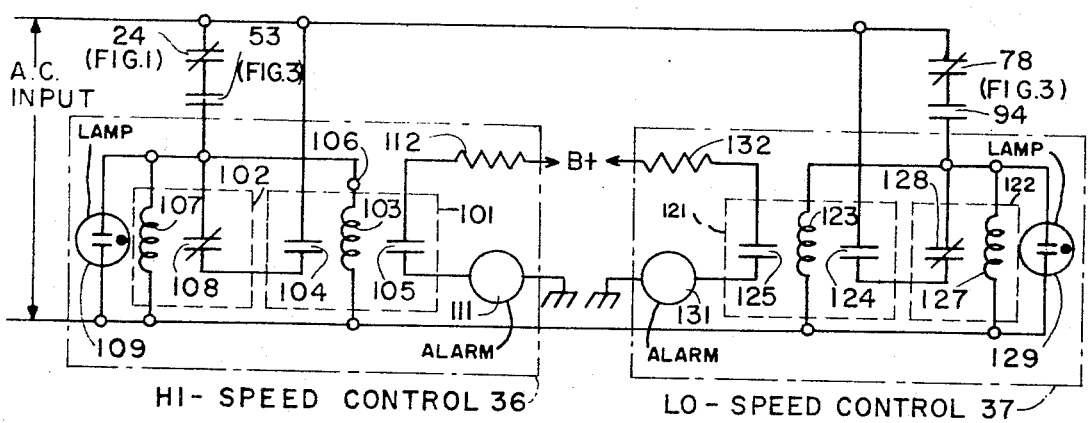
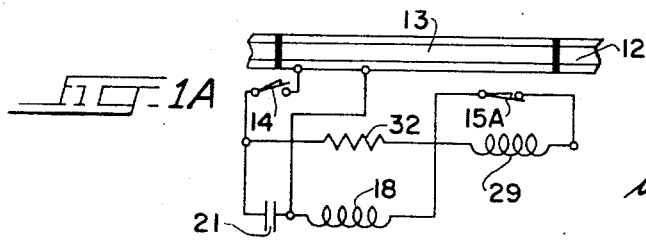
INVENTOR.
ROBERT B. McCUNE
BY
Wallace, Kinzer & Dorn
ATTYS

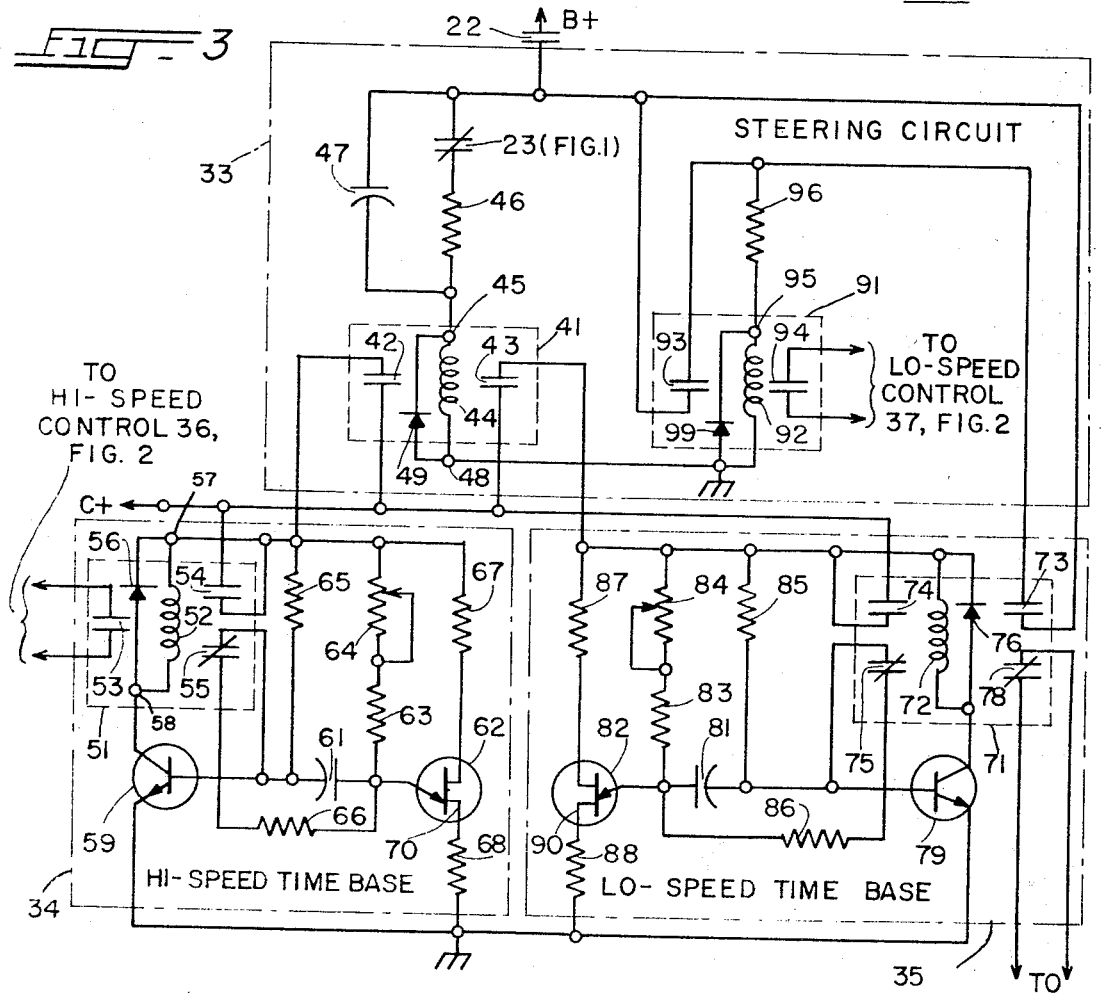
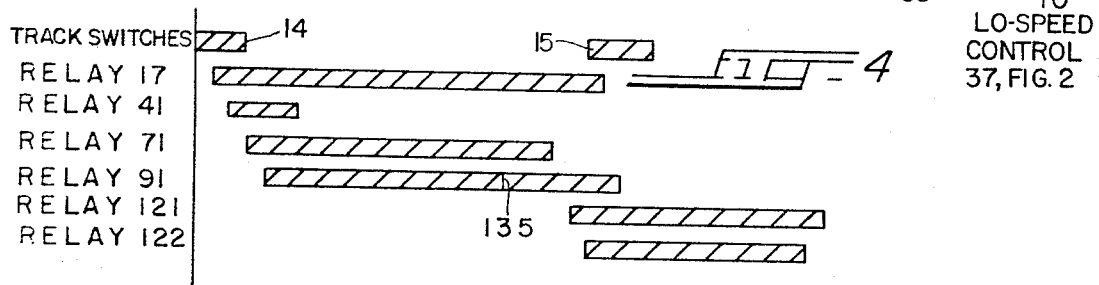
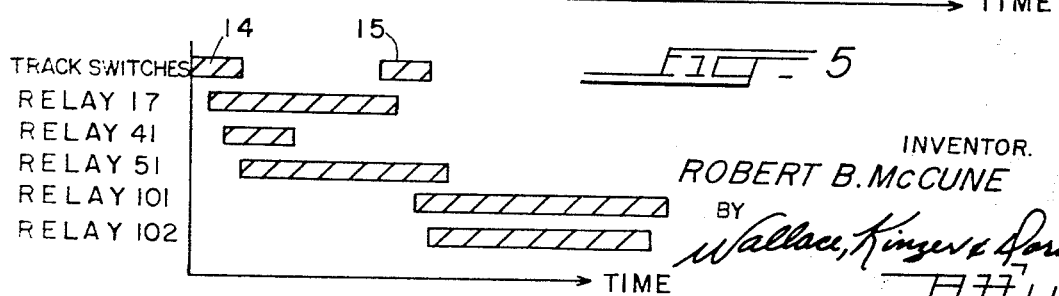

United States Patent Office 3,448,433
Patented June 3, 1969

3,448,433
OVERSPEED AND UNDERSPEED
ALARM SYSTEM
Robert B. McCune, Allendale, N.J., assignor to Abex
Corporation, a corporation of Delaware
Filed Jan. 18, 1966, Ser. No. 521,310
Int. Cl. B61l 3/02; G08b 21/00
U.S. Cl. 340—47                                    6 Claims

ABSTRACT OF THE DISCLOSURE

A speed control for a railroad classification yard comprising a pair of track switches, a track circuit actuated on and off by the track switches, a steering circuit actuated on for a predetermined time period each time the track circuit goes on, an overspeed time base and an underspeed time base each actuated on for an independent period when the steering circuit goes on, an overspeed control for performing one control function when the track circuit goes off before the overspeed time base turns off, an auxiliary switching device turned on by the underspeed time base and turned off by the track circuit, and an underspeed control device that performs a second control function whenever the underspeed time base turns off before the track circuit turns off.

---

This invention relates to a new and improved alarm and control system for use in a railroad classification yard. More particularly, the invention relates to a simple and inexpensive means for signalling overspeed or underspeed conditions for railroad cars moving through a classification yard; the warning signal may be employed to actuate an audible or a visual alarm or to perform any other desired control function.

In large classification yards, speed control for the cars being classified is frequently carried out as a virtually completely automatic function of rather complex sensing and control apparatus, acting through group and individual retarders that regulate the speed of the cars as they are switched onto the various classification tracks. The relatively expensive equipment required for automation of a classification yard, however, is economically infeasible with respect to small yards. In the smaller classification yards, the retarder apparatus is frequently operated under manual control or may even be of the fixed type, applying approximately equal braking to each car. Switching of the cars to the individual tracks in the classification yard is effected by yard switchmen who control the yard switches on a manual basis.

In the smaller classification yards, and particularly those using more primitive forms of retarder apparatus, any one car may be released from the retarder at a speed that is either above or below the normal permissible speed limits for the yard. If a car leaves the retarder at an excessive speed, the switchman may fail to perform the necessary switching operations to feed the car onto the desired classification track quickly enough. Furthermore, if the car is destined for a short classification track, the excessive speed of the car may cause it to ram another car on the track at a speed such as to damage its own contents or the contents of other cars already on the track. A car that leaves the retarder at an undesirably low speed, on the other hand, may stall out after being switched onto the selected classification branch. This stalled car may interfere with subsequent cars being shuttled or switched onto the same classification track.

The present invention is intended primarily as an inexpensive yet effective and reliable warning system for warning the personnel operating a small classification yard whenever a car moves into the yard at an excessive speed or at an unduly reduced speed. If the switchman is warned that a car leaving the retarder is moving too fast, he knows that he must act quickly to operate the required switches or must switch the car to a track where it can do no harm. If the car moving along the main classification track is too slow, the switching personnel, when duly warned, can permit the car to go straight through on the track where it can do no harm, rather than switching it to a classification track where the car might stall and interfere with subsequent operations.

Even in the smaller yards, it may be desirable to provide for automatic switching control with respect to cars that move toward classification at excessive or unduly reduced speeds. The alarm system of the present invention is equally effective to control electrically operated switches or other apparatus where this further degree of control is desired. It will be recognized that the alarm function of the system is basically a control function. Throughout the following specification and in the appended claims, the expression "control function" is used to apply to an audible alarm, to a visual signal, to the actuation of electrically or pneumatically controlled switches or similar apparatus, or to any combination of the foregoing.

It is a principal object of the present invention, therefore, to provide a new and improved speed sensing and control system for a railroad classification yard that is effective to perform appropriate control functions with respect to cars travelling at excessive speeds and with respect to cars moving at unduly low speeds, yet which is sufficiently low in cost to permit installation and utilization in even the smallest classification yards.

A specific object of the invention is to provide a simple and inexpensive speed sensing and control system for a railroad classification yard in which individual control functions are performed with respect to both overspeed and underspeed conditions and in which the limiting threshold values for the underspeed and overspeed control operations may be conveniently and quickly adjusted, completely independently of each other, to establish a normal speed range for the classification operation.

Another object of the invention is to incorporate in a velocity sensing and control system for a railroad classification yard a particularly reliable and accurate time base circuit for determining whether an individual car is moving through the yard at an excessive speed or at an unduly low speed.

A specific object of the invention is to provide a velocity sensing and control system for a railroad classification yard that is actuated by ordinary track switches but which is effectively immune to any chattering or other repetitive operation of the track switches.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles.

In the drawings:

FIG. 1 is a partially schematic block diagram of a velocity sensing and control system for a railroad classification yard constructed in accordance with one embodiment of the present invention;

FIG. 1A is a schematic diagram of a modification of the track switch circuit used in FIG. 1;

FIG. 2 is a schematic circuit diagram of the individual underspeed and overspeed control circuits for the system of FIG. 1;

FIG. 3 is a schematic circuit diagram of a steering circuit and individual overspeed and underspeed time base circuits employed in the system of FIG. 1;

FIG. 4 is a timing diagram for the system of FIGS. 1–3 pertaining to operation of the system with respect to an underspeed car; and FIG. 5 is a timing diagram, similar to FIG. 4, for an overspeed car.

FIG. 1 illustrates a velocity sensing and control system 10 for a small railroad classification yard as described hereinabove. In FIG. 1, the classification yard is represented only by the classification track 11. It should be understood that the track 11 constitutes the main or group track of the yard. The cars being classified roll along track 11 from left to right as in FIG. 1, as indicated by the arrow A. It may be assumed that the retarder for the yard is located to the left of the portion of track 11 shown in FIG. 1 and that the individual branching classification tracks, with their switches, are located to the right of track section 11.

In FIG. 1, one rail 12 of classification track 11 is shown as including an electrically insulated segment 13. It is not essential, with respect to the present invention, that the traffic rail include a separate insulated section, although such a section can be conveniently incorporated in the control system. In the illustrated system, first and second sensing devices 14 and 15 are mounted upon track segment 13. The sensing devices 14 and 15 may constitute conventional track switches which are engaged by the wheels of the individual railroad cars rolling along rail 12 of classification track 11. In particular, track switches 14 and 15 are momentary-contact normally-open switches which are closed by the wheels of the cars moving along the classification track.

Other forms of sensing devices responsive to movement of the railroad cars along classification track 11 may be substituted for track switches 14 and 15, although the track switches are, in general, the simplest and most reliable sensing devices presently available for this purpose. The two track switches should be spaced from each other by a distance less than the minimum spacing between adjacent wheels on the railroad cars. An appropriate spacing for the track switches is twenty-four inches.

The initial operating circuit in system 10 is a track circuit 16 that is illustrated in schematic detail in FIG. 1. Track circuit 16 comprises a track relay 17 having an operating coil 18, two sets of normally open contacts 21 and 22, and two sets of normally closed contacts 23 and 24. One terminal 25 of relay coil 18 is connected to one pole of the normally open track switch 15, which is the second of the two track switches engaged by each car moving along the track in the direction of the arrow A. The other pole of track switch 15 is connected to the isolated segment 13 of traffic rail 12. The second terminal 26 of coil 18 is directly connected to rail segment 13. Terminal 26 is also connected through the normally open contacts 21 of track relay 17 to one pole of the first track switch 14. The other pole of track switch 14, like track switch 15, is connected to rail segment 13. A separate electrical conductor, independent of the rail, can be used if desired.

Energization of track relay 17 is effected through a power transformer 27 having a primary winding 28 and a secondary winding 29. Primary winding 28 is connected to a suitable AC power supply 31. One terminal of secondary winding 29 is connected to terminal 25 of the relay operating coil 18. The other terminal of secondary winding 29 is connected through a resistor 32 to the normally open contacts 21 of the track relay and to the first track switch 14.

Contact pairs 22 and 23 of track relay 17 are electrically connected to each other. Both sets of contacts are also connected to a steering circuit 33. Steering circuit 33 is provided with suitable output circuits that connect the steering circuit to a high speed or overspeed time base circuit 34 and to a low speed or underspeed time base circuit 35. The steering circuit is also provided with an additional output that is connected to a low speed control or alarm circuit 37.

The underspeed control circuit 37, in addition to its connection to steering circuit 33, is provided with a second input from the underpseed time base 35. The underspeed control may comprise a visual alarm signal, such as a signal lamp of distinctive color, or may constitute an audible alarm, or both. Furthermore, circuit 37 may be connected to one or more electrically operable switches or other control devices in the classification yard to provide a more positive control action in addition to the alarm function.

System 10 further includes a high speed control or alarm circuit 36 that is generally similar to the underspeed circuit 37. Thus, like circuit 37, the overspeed control circuit 36 may constitute any appropriate device for giving an audible or visual alarm, or both, or for performing some other control function within the classification yard. The overspeed control device 36 is electrically connected to the overspeed time base circuit 34 and to the normally closed contacts 24 in track relay 17.

When a car moving along classification track 11 in the direction of arrow A enters the section of the track illustrated in FIG. 1, the leading wheel of the car first closes the first track switch 14. Closing of this switch completes an energizing circuit for the operating coil 18 of track relay 17. This energizing circuit extends from coil terminal 25 through transformer winding 29 and resistor 32 to switch 14, and from switch 14 through the electrically isolated track segment 13 back to the other terminal 26 of the relay coil.

Upon energization of operating coil 18, track relay 17 is actuated from its normal, stable, unenergized condition to an energized condition. This results in the closing of contact pairs 21 and 22 and the opening of contact pairs 23 and 24. Closing of contacts 21 establishes a holding circuit for the track relay that is independent of track switch 14. This circuit beginning at terminal 25 of coil 18, extends through the transformer secondary 29 and resistor 32 to contacts 21 and from contacts 21 back to the other terminal 26 of the relay coil. Thus, once switch 14 has been closed, the operating circuit provided by contacts 21 maintains track relay 17 in its energized condition, sometimes referred to hereinafter as the second stable condition of the track relay.

When track relay 17 is actuated to its second stable condition, having been energized as described above, the closing of the relay contacts 22 and the opening of the relay contacts 23 actuate steering circuit 33 from a normal operating condition to an actuated condition. Steering circuit 33, which is described in detail hereinafter in connection with FIG. 3, remains in its actuated conditon only for a predetermined short time interval. This time interval is made small enough so that it is substantially less than the time required for any car moving along track 11 to traverse the distance between sensing switches 14 and 15, even if the car is moving along classification track 11 at a grossly excessive speed. Steering circuit 33 serves primarily to actuate the two time base circuits 34 and 35. The steering circuit performs no other function with respect to overspeed cars and performs what is essentially an auxiliary function with respect to underspeed cars and the underspeed control circuit 37, as described more fully hereinafter.

The high speed time base circuit 34 is actuated from a normal quiescent condition to an active timing condition each time steering circuit 33 is actuated. Time base 34 remains in its active timing condition for a pre-selected period representative of a given threshold value for maximum car speed. That is, the operating period for the time base circuit 34 is selected to be representative of a given maximum speed for cars traversing the distance between sensing switches 14 and 15; any car that traverses the inter-switch distance in less time is thus identified as an overspeed car.

Similarly, the underspeed time base 35 is actuated from a normal quiescent condition to an active timing condition in response to a signal from the steering circuit 33.

The low speed time base 35 is adjusted to have an operating period representative of a minimum speed for cars traversing the space between track switches 14 and 15.

As the leading wheel of a car advances along classification track 11, it engages and closes track switch 15. Upon closing of switch 15, an effective short circuit is established, shunting operating coil 18 of track relay 17. The consequent reduction in voltage across coil 18 effectively de-energizes the relay, driving track circuit 16 from its stable energized condition back to its stable de-energized condition. It will be recognized that the same operation can be effected by substituting a normally closed track switch 15A for switch 15, connected in series with coil 18, switch 14 and contacts 21 instead of in shunt with coil 18; see FIG. 1A.

When relay 17 drops out, contacts 21 open, so that the relay can again be energized only upon closing of track switch 14. At the same time, contacts 22 open and contacts 23 close, preparing steering circuit 33 for the next operation. In addition, contacts 24 of the track relay close.

When the contacts 24 of track relay 17 close, the overspeed control device 36 may or may not become actuated, depending upon whether or not the overspeed time base 34 has completed its timing operation. Thus, the overspeed control device or alarm 36 is actuated to perform its control function whenever the track circuit 16 returns to its first stable condition, with relay 17 de-energized, before the overspeed time base returns to its normal quiescent condition. On the other hand, if the contacts 24 re-close, signalling a return of track circuit 16 to its first stable condition, after the overspeed time base 34 returns to its normal condition, then the high speed alarm or other control device 36 is not actuated.

Substantially similar control operations are effected by the underspeed control device 37. Steering circuit 33, as described hereinafter, effectively conditions the underspeed control device 37 for operation upon drop-out of track relay 17. If this action occurs before the underspeed time base 35 returns to its normal quiescent condition, the car speed is above the required minimum and the underspeed alarm or control device 37 is not actuated. On the other hand, if the signal from steering circuit 33 indicative of drop-out of track relay 17 occurs after the underspeed time base 35 has returned to its normal quiescent condition, the presence of a car moving at an undesirably low speed is indicated and the control device 37 is actuated to perform its control function, either by way of an alarm or more positive control action.

Typical circuit arrangements for the steering circuit 33 and for time base circuits 34 and 35 are shown in detail in FIG. 3. As illustrated therein, steering circuit 33 includes a steering relay 41 having two pair of normally open contacts 42 and 43 and an operating coil 44. One terminal 45 of operating coil 44 is connected through a resistor 46 to the normally closed contacts 23 of track relay 17 (see FIG. 1). The operating circuit for the coil further includes, in series, the normally open contacts 22 of track relay 17 (FIG. 1) and a connection to a suitable DC supply identified in FIG. 3 as B+. A capacitor 47 is connected in parallel with the series combination of resistor 46 and relay contacts 23. The other terminal 48 of coil 44 is returned to system ground. A diode 49 is connected in parallel with coil 44.

Contacts 42 and 43 of steering relay 41 are utilized to trigger operation of the time base circuits 34 and 35 respectively. The two time base circuits are essentially similar in construction to each other.

The overspeed time base circuit 34 comprises a relay 51 having an operating coil 52, two pairs 53 and 54 of normally open contacts, and a pair of normally closed contacts 55. A diode 56 is connected in parallel with relay coil 52. One terminal 57 of coil 52 is connected to a suitable DC supply designated in the drawing as C+, the connection being made through the normally open contacts 42 of steering relay 41. The other terminal 58 of coil 52 is connected to the collector electrode of a transistor 59, the emitter of the transistor being returned to system ground.

Contacts 54 are connected in a holding circuit for time base relay 51. Thus, contacts 54 are effectively connected in parrallel with the steering relay contacts 42 between terminal 57 of the time base relay coil 52 and the C+ supply.

The principal components of the timing circuit for time base circuit 34, in addition to relay 51 and transistor 59, constitute a capacitor 61 and a double-base unijunction switching transistor 62. The emitter electrode of transistor 62 is connected to capacitor 61 and is also connected through the series combination of a resistor 63 and a potentiometer 64 to the normally open contacts 42 of steering relay 41. The remaining terminal of capacitor 61 is connected through a resistor 65 to the steering relay contacts 42. A discharge circuit for the capacitor is provided by a resistor 66 that is connected in series with the normally closed contacts 55 of the time base relay 51 in parallel with the capacitor. The terminal of capacitor 61 that is connected to resistor 65 is also connected to the base electrode of transistor 59.

One base electrode for transistor 62 is connected through a resistor 67 to the normally open contacts 42 of steering relay 41. The second base electrode 70 of device 62 is returned to system ground through a resistor 68. The output connection for the high speed time base circuit 34 is provided through the normally open contacts 53 of relay 51, connected to the high speed control circuit 36 as described more fully hereinafter.

As noted above, the low speed time base circuit 35 is essentially identical in contruction to the high sped time base 34. Circuit 35 includes a low speed relay 71 having an operating coil 72 across which a diode 76 is connected. Relay 71 is provided with two sets of normally open contacts 73 and 74 and a pair or normally closed contacts 75. The operating coil 72 of the relay is connected to the C+ supply through the normally open contacts 43 of steering relay 41, the other terminal of the coil being returned to system ground through the collector emitter conduction path of a transistor 79.

The main timing circuit for low speed time base 35 includes a double-base unijunction transistor 82 and a timing capacitor 81. As before, the capacitor 81 is connected to the emitter of device 82, their common terminal being connected through the series combination of a resistor 83 and a potentiometer 84 to the normally open contacts 43 of steering relay 41. The remaining terminal of capacitor 81 is connected to the steering relay contacts 43 through a resistor 85 and is also connected to the base electrode of transistor 79. The discharge path required for capacitor 81 is provided through a resistor 86 that is connected in shunt relation to the capacitor, in series with the normally closed contacts 75 of relay 71. As before, the normally open contacts 74 of relay 71 are connected in a direct holding circuit for the relay. One of the base electrodes of transistor 82 is connected through a resistor 87 to the normally open contacts 43 of steering relay 41. The other base electrode 90 is returned to system ground through a resistor 88.

Time base 35 is not directly connected to the low speed control circuit 37. Instead, the normally open contacts 73 of low speed time base relay 71 are connected in a control circuit for an auxiliary relay 91 that is incorporated in steering circuit 33. Relay 91 includes an operating coil 92 and two pair of normally open contacts 93 and 94. One terminal 95 of relay coil 92 is connected through a resistor 96 to the normally open contacts 73 of time base relays 71 and thence through the normally open contacts 22 of the track relay (FIG. 1) to the B+ supply. A holding circuit is provided for the relay, extending from resistor 96 through the normally opened contacts 93 of the relay and through relay contacts 22 to B+. The remaining terminal of operating coil 92 is returned to system ground, a diode 99 being connected in parallel with the relay coil. The relay contacts 94 are connected to the low speed control circuit 37, FIG. 2.

FIG. 2 illustrates one form of the high speed and low speed control circuits 36 and 37 that may be actuated by the time base and steering circuits of FIG. 3. As shown therein, high speed control circuit 36 comprises a main operating relay 101 and a time delay relay 102. The control relay 101 includes an operating coil 103 and two pair of normally open contacts 104 and 105. One terminal 106 of coil 103 is connected to one side of an AC line through the series combination of the normally open relay contacts 53 of the high speed time base relay 51 (see FIG. 3) and the normally closed contacts 24 of track relay 17 (see FIG. 1). The other terminal of coil 103 is returned directly to the other side of the AC line. A similar circuit connection is provided for the operating coil 107 of the time delay relay 102, which relay is provided with a pair of normally closed contacts 108. The contacts 104 and 108 are connected in a holding circuit for the two relays, being connected in series from the AC line to each of the coils 103 and 107. A signal lamp 109 is connected in parallel with the two relay coils in circuit 36.

Control circuit 36, as illustrated in FIG. 2, further includes a relatively simple audible alarm device 111 which may constitute an electrically actuated buzzer or other noise-making signal apparatus. The device 111 has one terminal connected through the normally open contacts 105 of relay 101 and through a resistor 112 to the B+ supply. The other terminal of device 111 is grounded.

Low speed control circuit 37 is essentially similar to the high speed control 36 described hereinabove. It constitutes an operating relay 121 comprising a coil 123 and two sets of normally open contacts 124 and 125. One terminal of coil 123 is connected directly to one side of the AC line. The other terminal of the coil is connected through a series combination of the normally open relay contacts 94 in the auxiliary relay 91 and the normally closed contacts 78 of the low speed time base relay 71 (FIG. 3) to the other side of the AC line.

A time delay relay 122 is incorporated in low speed control circuit 37, this relay including an operating coil 127 and a pair of normally closed contacts 128. As before, relay contacts 124 and 128 are connected in a holding circuit for the two relay coils 123 and 127. A signal lamp 129 is again connected in parallel with the operating coils for the relays.

In the low speed control device 37 of FIG. 2, an audible alarm device 131 is again illustrated as a part of the control. As in the case of the high speed control, the alarm device is connected in series with the normally open relay contacts 125 and a resistor 132 between the B+ supply and ground. Of course, an A.C.-actuated alarm or other control device can be employed instead of the illustrated D.C. apparatus.

In considering operation of the circuits shown in detail in FIGS. 1-3, the timing charts of FIGS. 4 and 5 are of considerable assistance. The first operating condition to be considered is that of an underspeed car, one which is moving so slowly as to present a danger in the classification yard if it is released to a classification track. The timing for this operating condition is illustrated in FIG. 4.

The first action that occurs, upon movement of the underspeed car into the section of classification track 11 illustrated in FIG. 1, is the closing of the first track switch 14. As described above, closing of the switch 14 energizes track relay 17 so that the contacts 21 and 22 are closed and the contacts 23 and 24 are opened. The track relay remains energized until the second track switch 15 is closed, the time interval between actuation of the switches 14 and 15 (see FIG. 4) being representative of the period required for the lead wheel of the car (or any other wheel) to traverse the distance between the two switches.

Referring to FIG. 3, the initial inrush of charging current through capacitor 47, upon closing of the track relay contacts 22, is effective to energize the steering circuit relay 41. As the charge on capacitor 47 builds up, the current to coil 44 reduces exponentially. Consequently, relay 41 remains energized for only a short time interval, as is indicated in FIG. 4. During that time interval, relay contacts 42 and 43 (FIG. 3) are closed. With respect to the underspeed car, the closing of contacts 42 is not significant, as will be apparent from the ensuing description.

Closing of the contacts 43 of steering relay 41 completes an operating circuit for the relay 71 to low speed time base 35 (FIG. 3). This circuit extends from the C+ supply through contacts 43 to the operating coil 72 of the relay and from the coil through the collector-emitter conduction path of transistor 79 to system ground. Transistor 79 is normally biased to conduction by means of the biasing connection afforded by resistor 85. Thus, shortly after steering relay 41 has been actuated, the low speed time base relay 71 is also actuated, as shown in FIG. 4. Accordingly, low speed time base 35 is actuated from its normal quiescent condition to an active timing condition in response to actuation of the steering circuit 33.

Energization of relay 71 closes its contacts 73 and 74 and opens its contacts 75 and 78. The closing of contacts 74 affords a holding circuit for relay 71, keeping the relay energized after relay 41 drops out; it will be recalled that relay 41 remains actuated only for a short time interval. The closing of contacts 74 also maintains a charging circuit for capacitor 81, which controls the period of time during which the low speed time base 35 remains actuated.

Once relay 71 has been actuated, capacitor 81 charges through the circuit comprising potentiometer 84 and resistor 83. When the voltage across the capacitor reaches the firing voltage of the unijunction transistor 82, the transistor conducts through the circuit comprising the emitter and base 90, and thus discharges capacitor 81. Discharge of capacitor 81 drives transistor 79 to cut off by driving the base electrode of the transistor negatively. With transistor 79 cut off, the operating circuit for coil 72 of relay 71 is effectively opened, so that relay 71 drops out. It is thus seen that, once energized, the relay 71 of time base circuit 35 remains energized for a preselected period that is determined by the capacitance of capacitor 81 and by the resistance in the charging circuit for that capacitor. This period may be adjusted, independently of the corresponding period for the high speed time base 34, by adjustment of potentiometer 84.

When low speed time base 35 begins its timing period, upon energization of relay 71, the closing of contacts 73 establishes an energizing circuit for the auxiliary relay 91 in steering circuit 33. This circuit begins at the B+ supply and extends through contacts 22 and 73 (now closed) and resistor 96 to the relay coil 92 and thence to ground. Upon energization of relay 91, contacts 93 and 94 close. Contacts 93 establish a holding circuit for the relay keeping the relay energized even though time base relay 71 may drop out.

Closing of contacts 94 would establish an operating circuit for the relays 121 and 122 of the low speed control device 37 (FIG. 2) but for the fact that the relay contacts 78 in this circuit are now open due to actuation of the low speed time base relay 71. Thus, the actuation of auxiliary relay 91 does not immediately cause actuation of the low speed control device 37 or of either of its relays 121 and 122.

An underspeed car is one which requires a longer time to traverse the distance between track switches 14 and 15 than the threshold period established by low speed time base 35. Thus, the underspeed car closes switch 15 after relay 71 drops out, as indicated in the timing chart of FIG. 4. Under these conditions, upon dropout of relay 71, the contacts 78 close at a time when the contacts 94 of the auxiliary steering relay 91 are still closed. This completes an energizing circuit for the two low speed control relays 121 and 122. As soon as relay 121 is actuated, its contacts 125 close, energizing the alarm device 131 so that the workmen in the classification yard know that an underspeed car is traversing the classification track 11. Moreover, the signal lamp 129 is energized as long as contacts 78 and 94 remain closed.

The relay 122 of low speed control device 137 is a delayed-action device which opens the contacts 128 only after the relay has been energized for a predetermined time interval. Thus, even though the relay contacts 94 may be opened in the steering circuit auxiliary relay 91, the low speed control relays 121 and 122 remain energized through the holding circuit established by their contacts 124 and 128 for a preselected time interval, until relay 122 times out. When this occurs, the operating coil 123 of relay 121 is also de-energized by the consequent opening of contacts 128, shutting off alarm 131. At the same time, signal lamp 129 is de-energized.

From the foregoing description, it will be apparent that actuation of the low speed control relays 121 and 122 of circuit 73 is dependent upon the timing relationship between the auxiliary relay 91 and the low speed time base relay 71. For an underspeed car, as shown in FIG. 4, the low speed time base relay 71 returns to its normal quiescent condition, de-energized, before the auxiliary relay 91 is de-energized. If, on the other hand, the auxiliary relay 91 drops out before relay 71 is de-energized, then the low speed control relays cannot be energized because the contacts 78 and 94 are never closed at the same time (see FIG. 2). Thus, the underspeed control device 37 performs this control function, as by actuating the alarm 131, whenever the track circuit 16 returns to its first stable condition after the underspeed time base 35 returns to its normal quiescent condition. This is true because the auxiliary relay 91, in effect, duplicates the actions of the track circuit relay 17 with respect to return of these devices to their initial conditions (whenever track relay 17 drops out, contacts 22 open to de-energize relay 91). Stated differently, in those instances in which the relay 91 drops out before the relay 71, as indicated by the dash line 135 in FIG. 4, the relays 121 and 122 are never actuated and no alarm is given. The auxiliary relay is employed to preclude premature actuation of the low speed control 37 upon actuation of the track relay 17.

FIG. 5 illustrates the operating conditions in the several circuits of the system for an overspeed car. As with an underspeed car, closing of the initial track switch 14 serves to energize track relay 17 which remains energized until the second track switch 15 is closed. The steering relay 41 is again actuated by the charging current through capacitor 47 (FIG. 3) and remains in its actuated position for a short time interval determined by the capacitance 47 and the other circuit parameters. The consequent closing of contacts 42 of steering relay 41 is effective to energize the high speed control relay 51 and to establish a charging circuit for the capacitor 61 in the high speed time base circuit 34.

Energization of the high speed time base relay 51 closes its contacts 53. This would establish an energizing circuit for the high speed control relays 101 and 102 except for the fact that the normally closed contacts 24 of track relay 17 are presently open (see FIGS. 1 and 2). With an overspeed car, however, the car traverses the distance between the track switches 14 and 15 before capacitor 61 in the high speed time base circuit 34 (FIG. 3) reaches a voltage at which it can trigger device 62 to conduction. That is, the track relay 17 drops out before the high speed time base relay 51 drops out, a relationship illustrated in FIG. 5.

When this occurs, contacts 24 re-close while contacts 53 are still closed (FIG. 2). That is, the track circuit of the system returns to its first stable condition before the other speed time base 34 returns to its normal quiescent condition. Consequently, the control relays 101 and 102 are both energized.

Initially, energization of relay 102 (FIG. 2) does not open the contacts 108; these contacts open only after a predetermined time delay interval. Consequently, the closing of contacts 104 in relay 101 afford a holding circuit that maintains the relays 101 and 102 energized until contacts 108 open. The signal lamp 109 is also energized through this circuit. Closing of contacts 105 of relay 101, on the other hand, actuates the alarm 111 and thus gives an audible signal of the presence of an overspeed car on the classification track 11.

From the foregoing description, it will be apparent that any car which takes a longer time interval to traverse the track switches 14 and 15 than the time period established by the highspeed time base 34 will de-energize relay 17 only after relay 51 has dropped out. Under these conditions, the high speed control relays of circuit 36 are not energized and no alarm, visual or audible, is given. As in the case of the low speed time base, the potentiometer 64 of high speed time base 34 may be adjusted to establish an overspeed threshold value appropriate to the particular classification yard in which the system is employed, an adjustment that is independent of adjustment of the corresponding low speed threshold.

In many speed-determining devices based upon the use of track switches, erroneous operation may be experienced as a result of chattering of the switches. Such vibration of the track switches does not adversely affect the system of the present invention because the control element actuated by the switches, track relay 17, is not dependent upon the switches being held closed for any particular time interval and because the charging circuit arrangement used for the track relay makes it immaterial as to whether the track switch does chatter or vibrate. Thus, the system of the invention is not dependent upon any specific construction for the track switches so long as these devices can effect electrical contact for any appreciable interval upon engagement by the wheels of the car. Of course, it will apparent from the circuit arrangement of FIG. 1 that a separate conductor can be substituted for the insulated rail segment 13 if desired; the system of the invention is not dependent upon the availability of an isolated rail section.

In order to afford a more complete illustration of a system constructed in accordance with the present invention, certain specific circuit parameters are set forth in detail hereinafter. These circuit values afford a low speed range of three to six miles per hour and a high speed range of five to ten miles per hour, depending upon adjustment of potentiometers 84 and 64, respectively, using a track switch spacing of twenty-four inches. It should be understood that this information is provided solely by way of illustration and in no sense as a limitation on the present invention.

Resistors

| | | |
|---|---|---|
| 32 | ohms | 30 |
| 46, 66, 86 | do | 47 |
| 64, 84 | kilohms | 1.0 |
| 63, 83 | do | 8.2 |
| 67, 87 | ohms | 180 |
| 68, 88 | do | 27 |
| 96 | do | 500 |
| 112, 132 | do | 350 |

Capacitors

61 _____ 10 microfarad plus 4 microfarad, parallel.
81 _____ 10 microfarad plus 20 mirofarad, parallel.

Diodes, transistors

| | |
|---|---|
| 49 | 1N440 |
| 56, 76, 99 | 1N91 |
| 59, 79 | 2N1302 |
| 62, 82 | 2N1671B |

Power supplies

| | | |
|---|---|---|
| A.C. supply | | 115 volts, 60 cycles |
| B+ | volts | 43 |
| C+ | do | 24 |

The sensing and control system of the present invention is simple and inexpensive and is economically reasonable with respect to installation and utilization in even the smallest of classification yards. Nevertheless, the system affords adequate warning with respect to both overspeed and underspeed conditions; moreover, the resulting threshold speeds for both conditions may be conveniently and quickly adjusted, independently of each other, to fit the speed requirements of the yard in which the system is utilized. The foregoing description refers primarily to alarm devices, with respect to the output of the system, but it will be apparent that additional contacts can be incorporated in the overspeed and underspeed relays 101 and 121 to perform other control functions, such as the actuation of electrically operated switches, if desired. The time base circuits described hereinabove are particularly reliable and accurate and afford effective time control in a system actuated by ordinary track switches.

I claim:

1. A velocity sensing and control system for a railroad classification yard including a classification track along which railroad cars are moved in a given direction for classification, comprising:

first and second sensing devices disposed in spaced relation to each other along said track, each sensing device being actuatable between a normal operating condition and a second operating condition in response to movement of a car wheel past the sensing device;

a track circuit, connected to said sensing devices, actuatable from a first stable condition to a second stable condition in response to actuation of said first sensing device to its second operating condition, said track circuit further being actuatable from said second stable condition to said first stable condition in response to actuation of said second sensing device to its second operating condition;

a steering circuit, connected to said track circuit, actuatable from a normal operating condition to an actuated condition for a predetermined short time interval each time said track circuit is actuated to its second stable condition;

an adjustable overspeed time base connected to said steering circuit for actuation from a normal quiescent condition to an active timing condition for a preselected period in response to actuation of said steering circuit to its actuated condition;

and an overspeed control device, coupled to said overspeed time base and to said track circuit, for performing a given control function whenever said track circuit returns to its first stable condition before said overspeed time base returns to its normal quiescent condition.

2. A velocity sensing and control system for a railroad classification yard including a classification track along which railroad cars are moved in a given direction for classification, comprising:

first and second sensing devices disposed in spaced relation to each other along said track, each sensing device being actuatable between a normal operating condition and a second operating condition in response to movement of a car wheel past the sensing device;

a track circuit, connected to said sensing devices, actuatable from a first stable condition to a second stable condition in response to actuation of said first sensing device to its second operating condition, said track circuit further being actuatable from said second stable condition to said first stable condition in response to actuation of said second sensing device to its second operating condition;

a steering circuit, connected to said track circuit, actuatable from a normal operating condition to an actuated condition for a predetermined short time interval each time said track circuit is actuated to its second stable condition;

an adjustable underspeed time base, connected to said steering circuit for actuation from a normal quiescent condition to an active timing condition for a preselected period in response to actuation of said steering circuit to its actuated condition;

auxiliary switching means, coupled to said track circuit and to said underspeed time base, actuatable from a normal operating condition to an actuated condition in response to actuation of said underspeed time base to its active timing condition and actuatable back to its normal operating condition in response to actuation of said track circuit to its first stable condition;

and an underspeed control device, coupled to said underspeed time base and to said auxiliary switching means for performing a given control function whenever said track circuit returns to its first stable condition after said underspeed time base returns to its normal quiescent condition.

3. A velocity sensing and control system for a railroad classification yard including a classification track along which railroad cars are moved in a given direction for classification, comprising:

first and second sensing devices disposed in spaced relation to each other along said track, the spacing between said sensing devices being less than the minimum spacing between adjacent wheels on a railroad car, each sensing device being actuatable between a normal operating condition and a second operating condition in response to movement of a car wheel past the sensing device;

a track circuit, connected to said sensing devices, actuatable from a first stable condition to a second stable condition in response to actuation of said first sensing device to its second operating condition, said track circuit further being actuatable from said second stable condition to said first stable condition in response to actuation of said second sensing device to its second operating condition;

a steering circuit, connected to said track circuit actuatable from a normal operating condition to an actuated condition for a predetermined short time interval each time said track circuit is actuated to its second stable condition;

an overspeed time base and an underspeed time base, each connected to said steering circuit for actuation from a normal quiescent condition to an active timing condition for a preselected period in response to actuation of said steering circuit to its actuated condition, the periods for said time bases being adjustable independently of each other;

an overspeed control device, connected to said overspeed time base and to said track circuit, for performing a first given control function whenever said track circuit returns to its first stable condition before said overspeed time base returns to its normal quiescent condition;

auxiliary switching means, coupled to said track circuit and to said underspeed time base, actuatable from a normal operating condition to an actuated condition in response to actuation of said underspeed time base to its active timing condition and actuatable back to its normal operating condition in response to actuation of said track circuit to its first stable condition;

and an underspeed control device, coupled to said underspeed time base and to said auxiliary switching means, for performing a second given control function whenever said track circuit returns to its first stable condition after said underspeed time base returns to its normal quiescent condition.

4. A velocity sensing and control system for a railroad classification yard including a classification track along which railroad cars are moved in a given direction for classification, comprising:

first and second sensing devices disposed in spaced relation to each other along said track, the spacing between said sensing devices being less than the minimum spacing between adjacent wheels on a railroad car, each sensing device being actuatable from a normal operating condition to a second operating condition in response to movement of a car wheel past the sensing device;

a track circuit, comprising a track relay connected to said sensing devices and actuatable from a de-energized condition to an energized condition in response to actuation of said first sensing device to its second operating condition, a holding circuit for maintaining said track relay energized, and circuit means for effectively de-energizing said track relay in response to actuation of said second sensing device to its second operating condition;

a steering circuit, connected to said track relay, actuatable from a normal operating condition to an actuated condition for a predetermined short time interval each time said track relay is energized;

an overspeed time base and an underspeed time base, each connected to said steering circuit for actuation from a normal quiescent condition to an active timing condition for a preselected period in response to actuation of said steering circuit to its actuated condition, the periods for said time bases being adjustable independently of each other;

an overspeed control device, connected to said overspeed time base and to said track relay, for performing a first given control function whenever said track relay is de-energized before said overspeed time base returns to its normal quiescent condition;

auxiliary switching means, coupled to said track relay and to said underspeed time base, actuatable from a normal operating condition to an actuated condition in response to actuation of said underspeed time base to its active timing condition and actuatable back to its normal operating condition in response to actuation of said track relay to its de-energized condition;

and an underspeed control device, coupled to said underspeed time base and to said auxiliary switching means, for performing a second given control function whenever said track relay is de-energized after said underspeed time base returns to its normal quiescent condition.

5. A velocity sensing and control system for a railroad classification yard including a classification track along which railroad cars are moved in a given direction for classification, comprising:

first and second momentary-contact track switches disposed in spaced relation to each other along said track, the spacing between said track switches being less than the minimum spacing between adjacent wheels on a railroad car, each switch being actuatable from a normal open condition to a closed condition in response to movement of a car wheel past the switch;

a track circuit, comprising a track relay including an operating coil and having an energizing circuit connected to said first track switch for energizing said track relay coil in response to closing of said first switch, a holding circuit for maintaining said track relay coil energized, and a disabling circuit connecting said second track switch with said relay coil to de-energize said track relay upon closing of said second track switch;

a steering circuit, connected to said track circuit, actuatable from a normal operating condition to an actuated condition for a predetermined short time interval each time said track relay is energized;

an overspeed time base and an underspeed time base, each connected to said steering circuit for actuation from a normal quiescent condition to an active timing condition for a preselected period in response to actuation of said steering circuit to its actuated condition, the periods for said time bases being adjustable independently of each other;

an overspeed control device, connected to said overspeed time base and to said track circuit, for performing a first given control function whenever said track relay is de-energized before said overspeed time base returns to its normal quiescent condition;

auxiliary switching means, coupled to said track relay and to said underspeed time base, actuatable from a normal operating condition to an actuated condition in response to actuation of said underspeed time base to its active timing condition and actuatable back to its normal operating condition in response to actuation of said track relay to its de-energized condition;

and an underspeed control device, coupled to said underspeed time base and to said auxiliary switching means, for performing a second given control function whenever said track relay is de-energized after said underspeed time base returns to its normal quiescent condition.

6. A velocity sensing and control system for a railroad classification yard including a classification track along which railroad cars are moved in a given direction for classification, comprising:

first and second sensing devices disposed in spaced relation to each other along said track, each sensing device being actuatable between a normal operating condition and a second operating condition in response to movement of a car wheel past the sensing device;

a track circuit, connected to said sensing devices, actuatable from a first stable condition to a second stable condition in response to actuation of said first sensing device to its second operating condition, said track circuit further being actuatable from said second stable condition to said first stable condition in response to actuation of said second sensing device to its second operating condition;

a steering circuit, connected to said track circuit, actuatable from a normal operating condition to an actuated condition for a predetermined short time interval each time said track circuit is actuated to its second stable condition;

an adjustable time base connected to said steering circuit for actuation from a normal quiescent condition to an active timing condition for a preselected period in response to actuation of said steering circuit to its actuated condition, said time base comprising a monostable solid-state trigger device energized from said steering circuit and having an operating period independent of the interval during which said steering circuit remains in its actuated condition;

and a speed control device, coupled to said time base and to said track circuit, for performing a given control function whenever said track circuit returns to its first stable condition in predetermined time relation to the return of said time base to its normal quiescent condition.

References Cited

UNITED STATES PATENTS

| | | | |
|---|---|---|---|
| 1,958,631 | 5/1934 | Logan | 340—38 |
| 2,150,776 | 3/1939 | Moles. | |
| 2,623,163 | 12/1952 | Bone et al. | 246—108 |
| 2,996,630 | 8/1961 | Bensema et al. | |

JOHN W. CALDWELL, *Primary Examiner.*

KENNETH N. LEIMER, *Assistant Examiner.*

U.S. Cl. X.R.

246—182; 340—263